United States Patent [19]
Ishiguro et al.

[11] Patent Number: 5,627,930
[45] Date of Patent: May 6, 1997

[54] ARRAYED OPTICAL FIBER COUPLER AND METHOD OF MANUFACTURING THE SAME

[75] Inventors: Yoichi Ishiguro; Shigeru Semura; Yuji Kobayashi; Toshiyuki Wakinosono; Tomoyuki Hattori; Hiroshi Suganuma; Eisuke Sasaoka; Hiroaki Takimoto, all of Yokohama, Japan

[73] Assignee: Sumitomo Electric Industries, Ltd., Osaka, Japan

[21] Appl. No.: 360,708
[22] PCT Filed: Apr. 18, 1994
[86] PCT No.: PCT/JP94/00638
§ 371 Date: May 2, 1995
§ 102(e) Date: May 2, 1995
[87] PCT Pub. No.: WO94/24591
PCT Pub. Date: Oct. 27, 1994

[30] Foreign Application Priority Data

Apr. 19, 1993 [JP] Japan .................. 5-091094

[51] Int. Cl.⁶ ........................................ G02B 6/38
[52] U.S. Cl. .................. 385/51; 385/99; 385/96; 385/43; 385/48
[58] Field of Search ............... 385/51, 43, 42, 385/48, 96–99

[56] References Cited

U.S. PATENT DOCUMENTS

| | | | |
|---|---|---|---|
| 4,778,242 | 10/1988 | Ota et al. | 385/99 |
| 4,812,010 | 3/1989 | Osaka et al. | 385/96 |
| 4,990,208 | 2/1991 | Kano | 156/275.3 |
| 5,367,591 | 11/1994 | Seike et al. | 385/51 |
| 5,430,821 | 7/1995 | Sasoka et al. | 385/99 |

FOREIGN PATENT DOCUMENTS

| | | |
|---|---|---|
| 0350900 | 1/1990 | European Pat. Off. . |
| 0525743 | 2/1993 | European Pat. Off. . |
| 63-205615 | 8/1988 | Japan . |
| 63-254406 | 10/1988 | Japan . |
| 1267603 | 10/1989 | Japan . |
| 2-29007 | 2/1990 | Japan . |
| 3107111 | 5/1991 | Japan . |
| 5-34540 | 2/1993 | Japan . |

OTHER PUBLICATIONS

Patent Abstracts of Japan, vol. 5, No. 120 (C-065) Aug. 4, 1981 & JP-A-56 057 803 (SOMAR).

Primary Examiner—John Ngo
Attorney, Agent, or Firm—Pillsbury Madison & Sutro, L.L.P.

[57] ABSTRACT

In a case where an arrayed optical fiber coupler obtained from a tape ribbon 1 is fixed to an reinforcement case 3, a glass portions 2b as a non-elongated portion outside of the elongated portions 2c of the coupler and a protection coating layers 2a at the back thereof are fixed to the reinforcement case 3 with an adhesive layer 4. A collectively coating resin layer 1a of the tape ribbon 1 is not fixed to the reinforcement case 3. The resin layer 1a is fixed to the reinforcement case 3 with a soft adhesive layer 5 different from the above adhesive layer 4, if necessary. As the resin of the adhesive layer 4, there is preferable an adhesive having the viscosity of 50 to 200 P and thermosetting property in addition to ultraviolet cure property.

13 Claims, 13 Drawing Sheets

FIG. IIA

FIG. IIB

ARRAYED OPTICAL FIBER COUPLER AND METHOD OF MANUFACTURING THE SAME

FIELD OF THE INVENTION

The present invention relates to an arrayed optical fiber coupler in which 2n optical core fibers are melted, coupled and elongated and a method of manufacturing the same.

BACKGROUND OF THE INVENTION

Generally, a conventional optical fiber coupler has a drawback that it easily changes in characteristics and is damaged due to external force or temperature change, because it has a small outer diameter portion of a few tens of μm. Therefore, the conventional optical fiber coupler is designed such that the coupler for the melted, coupled and elongated optical fibers is fixed to a reinforcement substrate having a linear expansion coefficient as much as quartz, so that the characteristics are stable.

As the reinforcement substrate, a plate member is used as described in Japanese Utility Model Application Laying-open No. 23408/1989 and a pipe member is used as described in Japanese Patent Application Laying-open No. 63907/1989, for example.

On the other hand, thermosetting adhesive or ultraviolet cure adhesive of epoxy, urethane acrylate, and cyanoacrylate is used as the adhesive for adhering the conventional coupler.

Recently, a high density optical communication line has developed so that the number of optical couplers increases. Therefore, since the conventional optical fiber coupler is designed to couple a pair of optical fibers to each other, there are caused problems that an occupied area by the optical fiber coupler increases and accommodation of excess portions at the ends of the optical fibers is complex.

On the contrary, as disclosed in Japanese Patent Application Laying-open No. 295211/1990, for instance, the reinforcing method of the optical fiber coupler is proposed in which after an optical fiber coupler for coupling two optical fibers is fixed to a reinforcement member so that a plurality of reinforcement members are accommodated in a package, the optical fibers are coupled outside of the package by a tape to construct an arrayed optical fiber coupler. Another method of reinforcing an optical fiber coupler is proposed in which optical fiber couplers for each coupling two optical fibers to each other are arranged on a fixing member having a plurality of grooves in a comb manner, as disclosed in Japanese Patent Application Laying-open No. 254406/1988.

The methods disclosed in the above Japanese Patent Application Laying-open No. 295211/1990 and Japanese Patent Application Laying-open No. 254406/1988 are complicated and have a problem that it takes a long time to form an arrayed optical fiber coupler because the optical fiber couplers for each coupling two optical fibers are mounted in a high density manner.

For this reason, as disclosed in Japanese Patent Application Laying-open No. 120510/1990, the method is tried in which an arrayed optical fiber coupler is directly constituted from arrayed optical fiber ribbons. In a case that the arrayed optical fiber coupler is fixed to a reinforcement substrate, however, there is a problem that the transmission characteristics are remarkably degraded due to temperature change or humidity change.

Figure 10A:
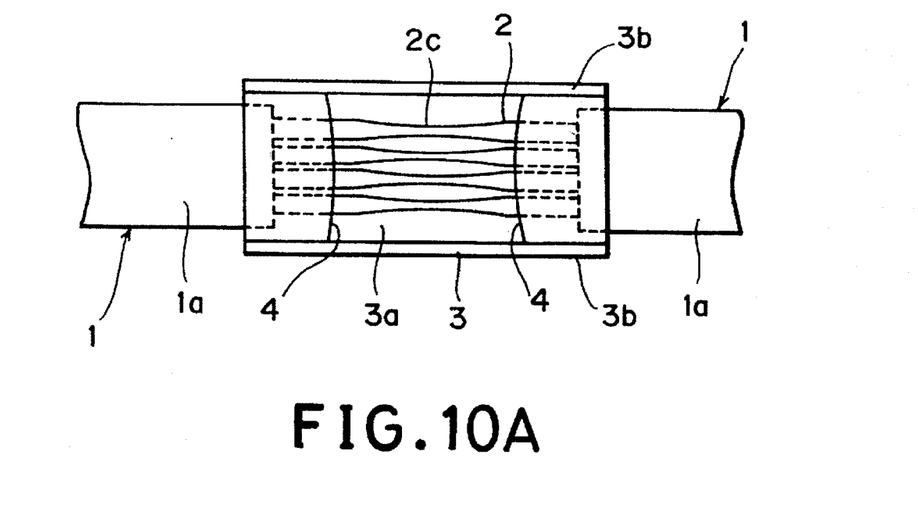
FIG. 10A is a plan view.
Figure 10B:
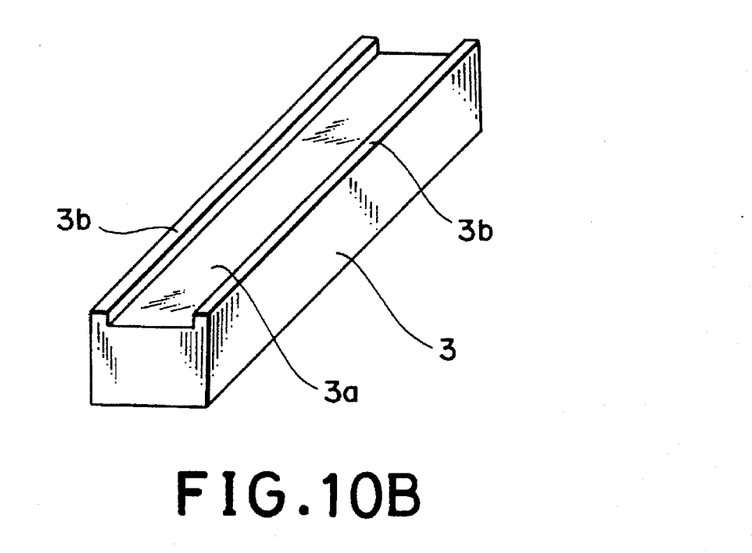
FIG. 10B is a perspective view of the reinforcement case used in the reinforcement structure shown in FIG. 10A.
Figure 10C:
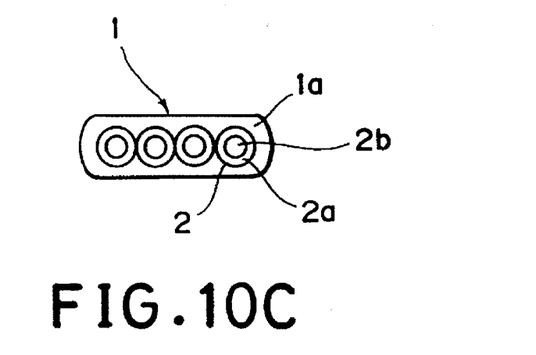
FIG. 10C is a cross sectional view of a 4-core type tape ribbon.

FIGS. 10A, 10B and 10C show a reinforcement structure in a conventional arrayed optical fiber coupler. FIG. 10A is a plan view of the reinforcement structure, FIG. 10B is a perspective view of a reinforcement case used in the reinforcement structure shown in FIG. 10A, and FIG. 10C is a cross sectional view of an arrayed optical fiber ribbon used in the reinforcement structure shown in FIG. 10A. A reference numeral 1 denotes an arrayed optical fiber ribbon in FIG. 10C. This arrayed optical fiber ribbon 1 is constituted by collectively coating four optical fibers 2 each having a protection coating layer 2a with a coating layer 1a. A reference numeral 3 denotes a reinforcement case in FIGS. 10A and 10B. On the upper surface 3a of the reinforcement case 3, a pair of fixed walls 3b extending along a longitudinal direction of the case in parallel to each other at both side edges are provided to prevent the displacement of the optical fiber ribbon 1 by the reinforcement structure.

In this arrayed optical fiber ribbon 1, after part of the coating layer 1a and protection coating layer 2a of each optical fiber is removed to expose a glass portion of the optical fiber 2, the ribbons 1 are overlain in a vertical direction and corresponding glass portions 2b are heated and elongated to be melted and coupled. The glass portion 2b is fixed to the upper surface 3a and the fixed wall 3b of the reinforcement case 3 by an adhesive layer 4, as well as the coating resin layer 1a of the optical fiber ribbon 1.

However, because distortion remained in the collectively coating resin layer 1a from when the arrayed optical fiber ribbon 1 has been manufactured is released in a form of contraction of the collectively coating resin layer 1a due to temperature change or humidity change, a relative shift is caused between the collectively coating resin layer 1a and the glass portion 2b including a melted, bonded and elongated portion. Thus, in the conventional arrayed optical fiber coupler, because the collectively coating resin layer 1a is strongly fixed to the reinforcement case 3, a stress is generated at a melted, bonded and elongated portion having a small diameter so that the transmission characteristics of the optical fiber coupler is changed.

Figure 11A:
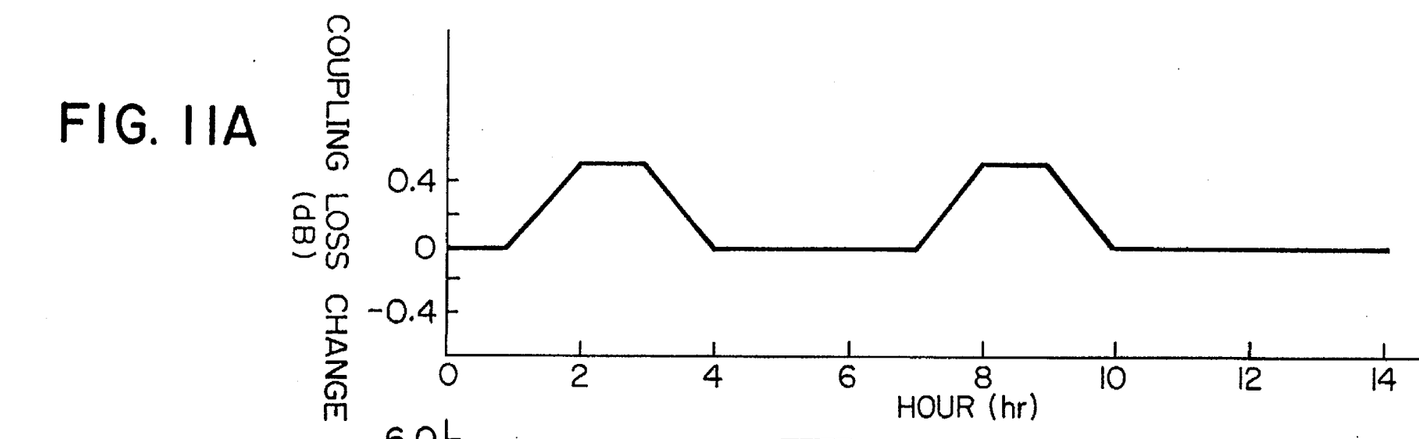
FIG. 11 is a graph showing the change of coupling loss in a heat cycle test.
Figure 11B:
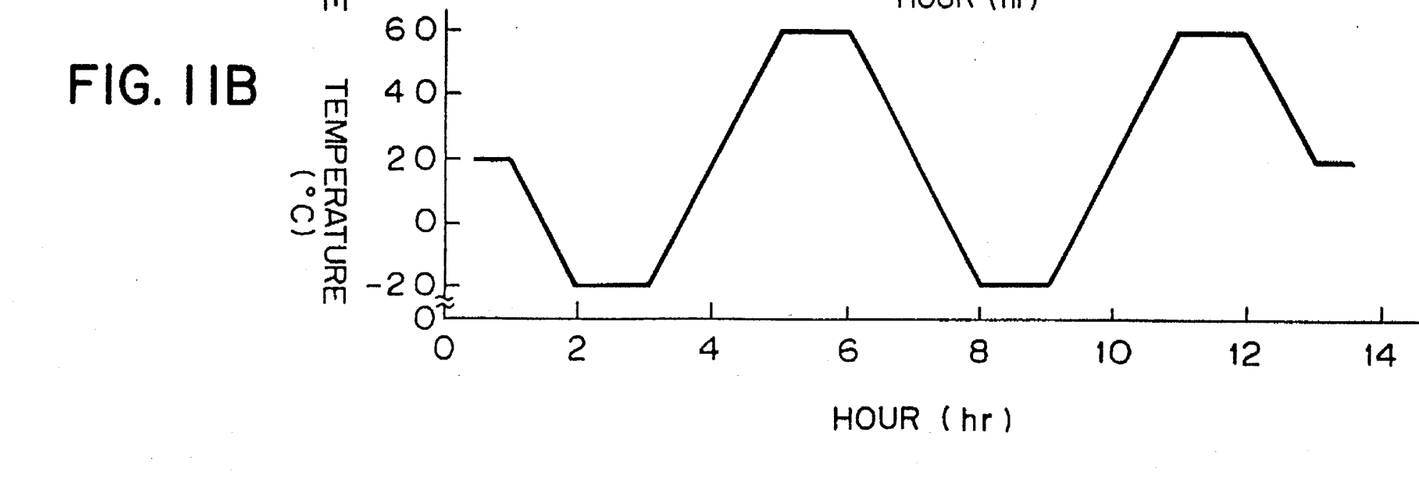
Figure 12:
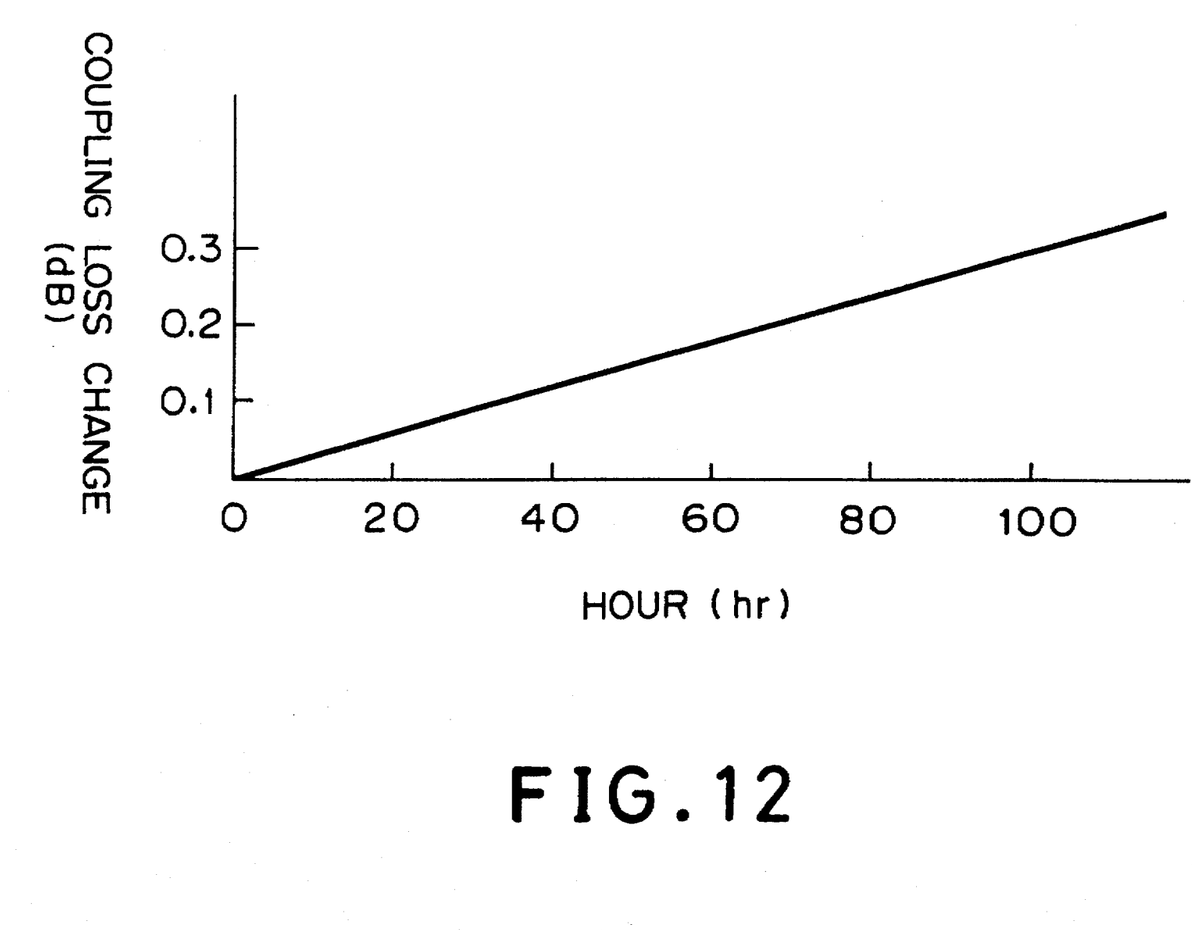
FIG. 12 is a graph showing the change of coupling loss under high humid and hot circumstance.

In a case where four or more optical fibers are collectively adhered and fixed to the reinforcement member, the optical fiber coupler does often not have sufficient circumstance resistance characteristics. For instance, an allowable change value is generally 0.2 dB or less in a heat cycle test in which temperature load of −20° to +60° C. is applied to the optical fiber coupler to examine characteristics change. However, in the above structure, the change value of about 0.5 dB is often observed, as shown in FIG. 11. The change value needs to be 0.2 dB or less after 100 hours in a characteristics change test under 60° C. and 95%. In the above structure, the more than 0.3 dB change values are frequently observed, as shown in FIG. 12. It should be noted that in FIG. 11 the abscissa represents time length of the heat cycle test, the ordinate represents temperature in the heat cycle test and change value of coupling loss due to the heat cycle test and that in FIG. 12 the abscissa represents time length during which a sample is exposed under humidity and heat condition and the ordinate represents change value of coupling loss under the humidity and heat condition.

An object of the present invention is to provide an arrayed optical fiber coupler and a method of manufacturing the same in which the arrayed optical fiber coupler has a reinforcement structure with sufficient circumstance resistance characteristics and, even if a relative shift is caused between a collectively coating resin layer and a glass portion of optical fiber ribbon because of distortion remained in the collectively coating resin layer from when the optical fiber ribbon is manufactured, a melted, coupled and elongated portion is not influenced due to the relative shift.

DISCLOSURE OF THE INVENTION

In order to achieve the object of the present invention, the invention defined in claim 1 is characterized by having a melted, bonded and elongated portion which is formed such that glass portions of an arrayed optical fiber ribbon and another glass portions of another arrayed optical fiber ribbon are melted, bonded and elongated in an opposing state to each other, the arrayed optical fiber ribbon comprising a plurality of optical fibers being arranged in parallel to each other and being entirely coated with a collectively coating resin layer, each of the plurality of optical fibers including a glass portion and a protection coating layer for protecting the glass portion, and by having a reinforcement structure in which a peripheral glass portion and said protection coating layer are fixed to a reinforcement member.

The optical fiber includes one in which the protection coating layer is formed on a glass portion of the optical fiber which is composed of quartz glass. As the protection coating layer, two layers coating is typically performed of a layer of soft material of a Young's modulus of 1 Kg/mm$^2$ or less and a layer of hard material of a Young's modulus of 10 Kg/mm$^2$. However, one layer coating or three layers coating may be used. In addition, a blue layer may be provided as the outermost layer of the protection coating layer for identifying.

The arrayed optical fiber ribbon has the structure in which the plurality of optical fibers are arranged in parallel to each other and are coated with the collectively coating resin. The number of optical fibers is 2, 4 or 8, for instance, but it is not limited.

Ultraviolet cure or thermosetting type resin is used for the collectively coating resin layer but resin is not limited to them.

In the invention defined in claim 2, the reinforcement structure may be fixed via the adhesive layer in the arrayed optical fiber coupler defined in claim 1.

In the invention defined in claim 3, the coupler may have the reinforcement structure in which the collectively coating resin layer of the arrayed optical fiber ribbon is fixed to the reinforcement member via an adhesive layer different from the adhesive layer via which the reinforcement structure is fixed in the arrayed optical fiber coupler defined in claim 2.

In the invention defined in claim 4, the adhesive of the adhesive layer via which the collectively coating resin layer of the arrayed optical fiber ribbon is fixed to the reinforcement member may have Young's modulus of 1 Kg/mm$^2$ or less in the arrayed optical fiber coupler defined in claim 3.

In the invention defined in claim 5, the fixing of the arrayed optical fiber ribbon to the reinforcement member includes only the fixing of the peripheral glass portions and the protection coating layers outside of the peripheral glass portions to the reinforcement member in the arrayed optical fiber coupler defined claim 1 or 2.

In the invention defined in claim 6, the reinforcement member may have grooves for each arranging the two optical fibers of the arrayed optical fiber ribbon in parallel to each other in the arrayed optical fiber coupler defined in any one of claims 1 to 5.

In the invention defined in claim 7, the adhesive layer may be formed of an adhesive having the viscosity of 50 to 200 P before cure in the arrayed optical fiber coupler defined in claim 2.

In the invention defined in claim 8, the adhesive layer may be formed of an adhesive having the thermosetting property and the ultraviolet cure property in the arrayed optical fiber coupler defined in claim 2.

In the invention defined in claim 9, a method of manufacturing an arrayed optical fiber coupler characterized by comprising the steps of removing collectively coating resin layers and protection coating layers of middle portions of two arrayed optical fiber ribbons to expose glass portions, an optical fiber including a glass portion and the protection coating layer for protecting the glass portion, the arrayed optical fiber ribbon being constituted by coating all the n (n is natural number) optical fibers arranged in parallel by the collectively coating resin layer; heating, melting, connecting and elongating the exposed glass portions of the optical fibers for every two to form elongated portion; and fixing to a reinforcement member the glass portions sandwiched from the both sides of the elongated portion and the protection coating layer outside of the exposed glass.

In the invention defined in claim 10, in a method according to claim 9, an adhesive having the viscosity of 50 to 200 P before the cure may be used for the fixing.

In the invention defined claim 11, in a method according to claim 9, an adhesive having thermosetting property and ultraviolet cure property may be used for the fixing.

In the invention defined in claim 12, in a method of manufacturing an arrayed optical fiber coupler comprising the steps of removing coating from 2n optical fibers (n is a natural number) to expose glass portions; arranging the optical fiber glass portions in parallel for every two; and after collectively melting and elongating the arranged optical fibers, collectively fixing to a reinforcement member, the method is characterized in that said fixing comprises fixing with an adhesive having the viscosity of 50 to 200 P before the cure.

In the invention defined in claim 13, in a method according to claim 12, the adhesive may be replaced with an adhesive having thermosetting property and ultraviolet cure property.

In the invention defined in claim 14, in a method according to claim 12 or 13, the 2n optical fibers may be of two tape type optical fiber ribbons.

In the present invention, the influence to the melted, coupled and elongated portion can be prevented by not fixing the collectively coating resin layer to the reinforcement member or by fixing the resin layer to the reinforcement member with a soft adhesive, even if the collectively coating resin layer removes relatively to the glass portions.

In the present invention, by fixing the optical fibers with the resin having the viscosity of 50 to 200 P before the cure, any space in the resin surrounded by the optical fibers can be prevented from being generated so that the coupler can be obtained with less characteristic change for a heat cycle. Also, by using-both thermosetting type and ultraviolet cure type resin as an adhesive, the resin hardness can be increased even in the lower portion of the optical fibers, so that the coupler can be obtained with the superior heat and humid resistance characteristics.

BRIEF DESCRIPTION OF THE DRAWINGS

FIGS. 1A, 1B and 1C show an arrayed optical fiber coupler according to the first embodiment of the present invention.

FIGS. 3A, 3B and 3C show an arrayed optical fiber coupler according to the second embodiment of the present invention.

FIGS. 5A, 5B and 5C show an arrayed optical fiber coupler according to the third embodiment of the present invention.

FIGS. 7A, 7B and 7C show an arrayed optical fiber coupler according to the fourth embodiment of the present invention.

FIGS. 8A and 8B are cross sectional views showing an example of a tape ribbon appliribbon to a reinforcement structure in the arrayed optical fiber coupler of the present invention, FIG. 8a shows a 2-arrayed tape ribbon.

FIGS. 10A, 10B and 10C show the reinforcement structure in a conventional arrayed optical fiber coupler.

FIGS. 13A and 13B are cross sectional views showing an expanded cross section structure of a fixed portion in the arrayed optical fiber coupler.

THE BEST MODE OF PREFERRED EMBODIMENTS

The embodiments of the present invention will be described below with reference to the accompanying drawings.

Figure 1A:
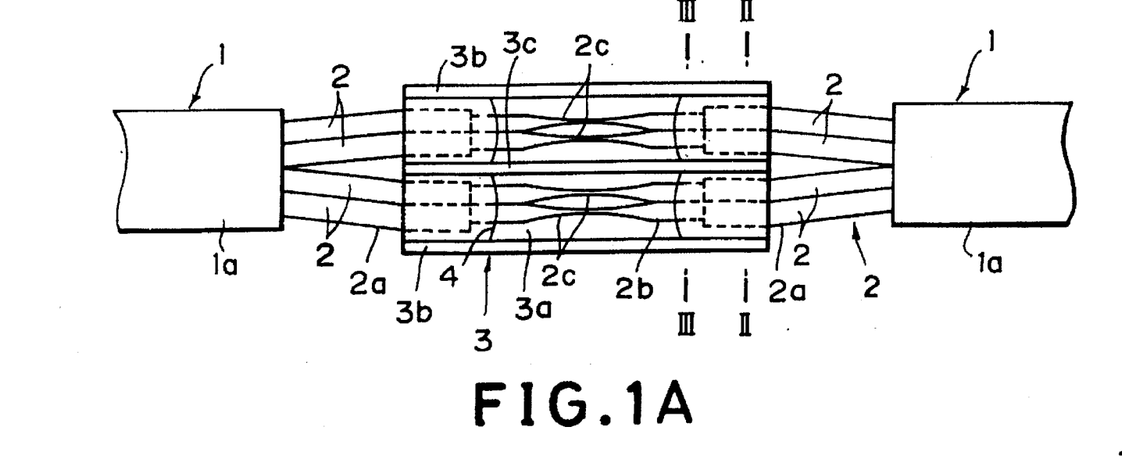
FIG. 1A is a plan view.
Figure 1B:
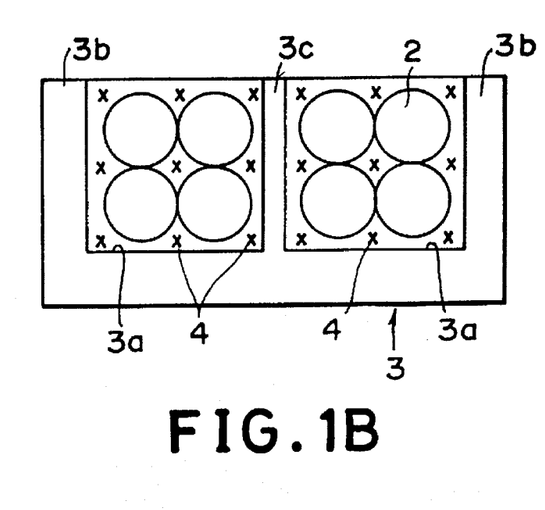
FIG. 1B is a cross sectional view taken along the II—II line.
Figure 1C:
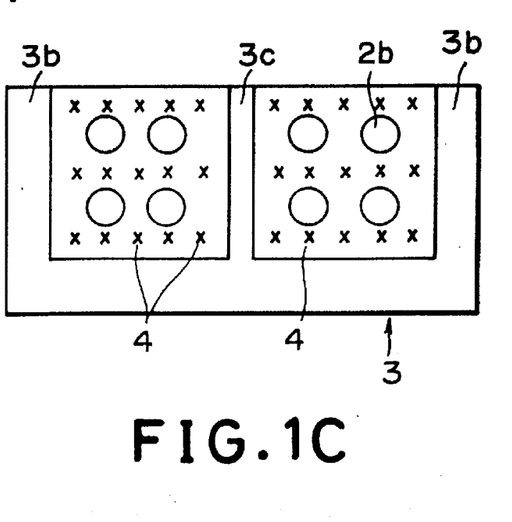
FIG. 1C is a cross sectional view taken along the III—III line.
Figure 2:
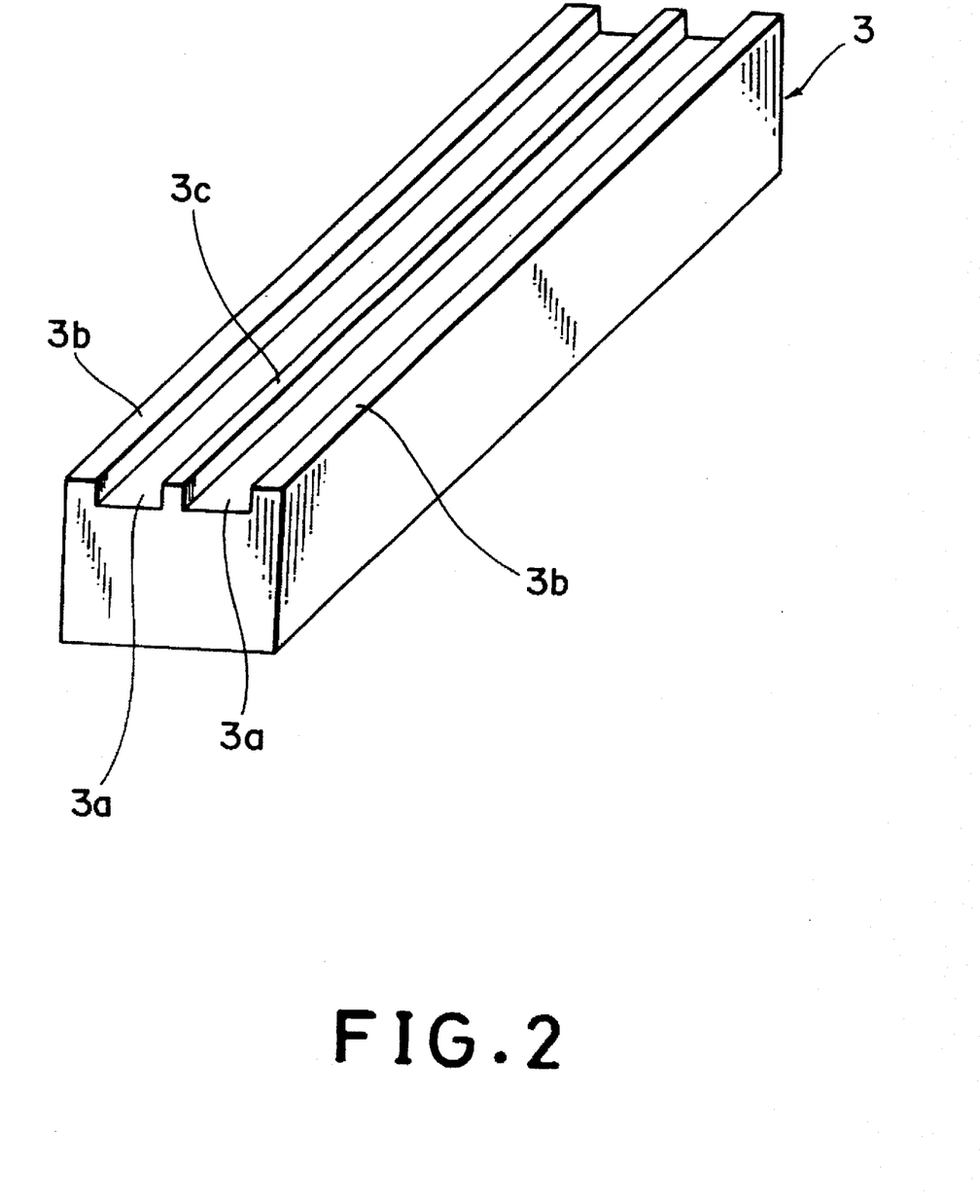
FIG. 2 is a perspective view of a reinforcement case appliribbon to the first embodiment shown in FIGS. 1A, 1B and 1C.

FIGS. 1A, 1B and 1C show an arrayed optical fiber coupler according to the first embodiment of the present invention. More specifically, FIG. 1A is the plan view of the coupler, FIG. 1B is the cross sectional view of the coupler taken along the line II—II, and FIG. 1C is the cross sectional view of the coupler taken along the line III—III. FIG. 2 is a perspective view of a reinforcement case as a reinforcement member used in the first embodiment.

The embodiment of the present invention will be described below with reference to the accompanying drawings.

Of constituent elements in the present embodiment shown in FIGS. 1A, 1B, 1C, and 2, the same ones as those of the reinforcement structure in the conventional arrayed optical fiber coupler shown in FIGS. 10A, 10B and 10C are assigned with the same reference numerals and the description will be omitted.

The present embodiment will be described with reference to a 4-core type optical fiber ribbon 1 shown in FIG. 10C. A collectively coating resin layer 1a in the central portion of the 4-core type optical fiber ribbon 1 is removed and optical fibers 2 are separated into for every two fibers. Next, a protection coating layer 2a of each of the optical fibers 2 is removed such that a glass portion thereof is exposed. Preferably the protection coating layer 2a is not removed over the separated optical fiber portion but removed in a minimum, in consideration of strength stability. Another 4-core type optical fiber ribbon 1 which is prepared in the same manner as described above to expose the glass portions 2b is overlain on the above-mentioned ribbon 1. The glass portions 2b of the corresponding optical fibers 2 of the optical fiber ribbons 1 are heated and melted and coupled to each other. Then, the glass portions are elongated to form a melted, coupled and elongated section 2c having a small diameter as shown in FIG. 1A. Since the optical fibers 2 are separated for every two lines, a group is constituted of 4 optical fibers 2 of the upper and lower ribbons 1 by the melting, coupling and elongating process. Thus, the arrayed optical fiber coupler composed of two groups of four optical fibers 2 can be obtained from the two overlain 4-core type optical fiber ribbons 1.

There is one of the features of the present invention in the structure in which such an arrayed optical fiber coupler is fixed to a reinforcement case 3 shown in FIG. 2. That is, the reinforcement case 3 shown in FIG. 2 has a partitioning wall 3c between the fixed walls 3b in the central portion on the upper surface 3a of the reinforcement case 3 shown in FIG. 10B so that a groove portion is divided into two grooves by the partitioning wall 3c. Each of the groups of four optical fibers 2 is arranged such that the elongated portions 2c thereof are positioned in the central portion of one groove and the glass portions 2b and the protection coating layers 2a of these optical fibers are fixed to the groove via an adhesive layer 4. FIG. 1B shows the fixing structure of the four optical fibers 2 to the reinforcement case 3 and FIG. 1C shows a fixing structure of the glass portions extending from the above fixing structure.

In the present embodiment, the collectively coating resin layer 1a of the optical fiber ribbon 1 is not fixed to the reinforcement case 3. Therefore, the influence due to distortion remained in the collective coating resin layer 1a from when the optical fiber ribbon 1 is manufactured can be eliminated so that the degradation of transmission characteristics can be avoided.

Figure 3A:
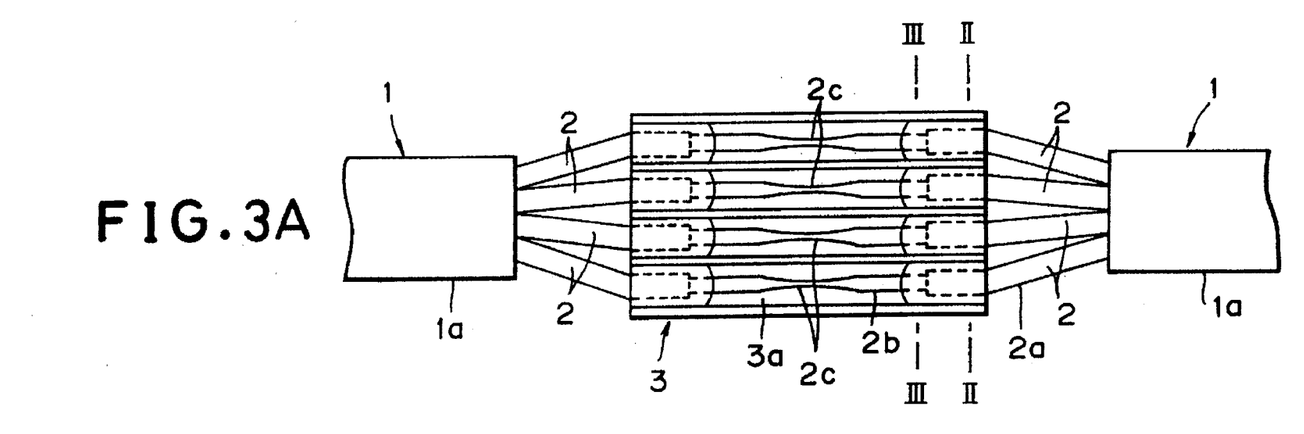
FIG. 3A is a plan view.
Figure 3B:
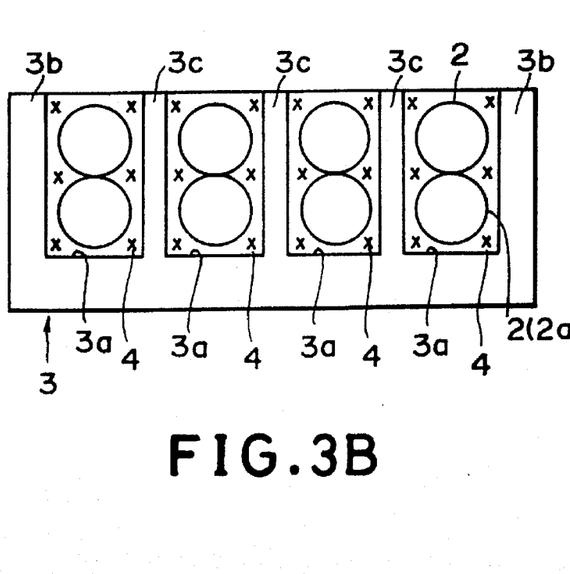
FIG. 3B is a cross sectional view taken along the II—II line.
Figure 3C:
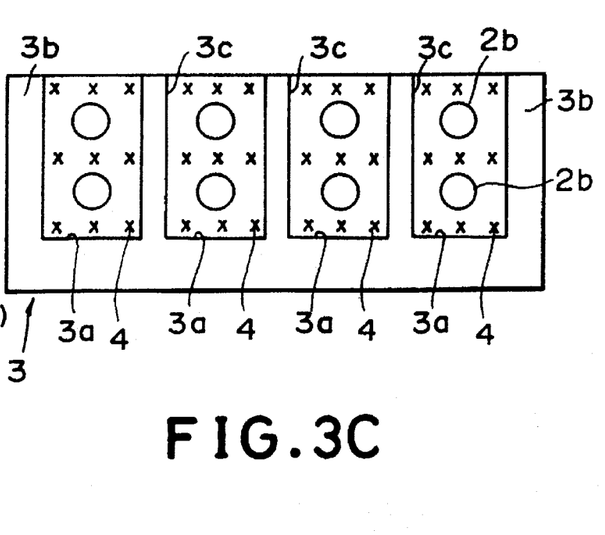
FIG. 3C is a cross sectional view taken along the III—III line.
Figure 4:
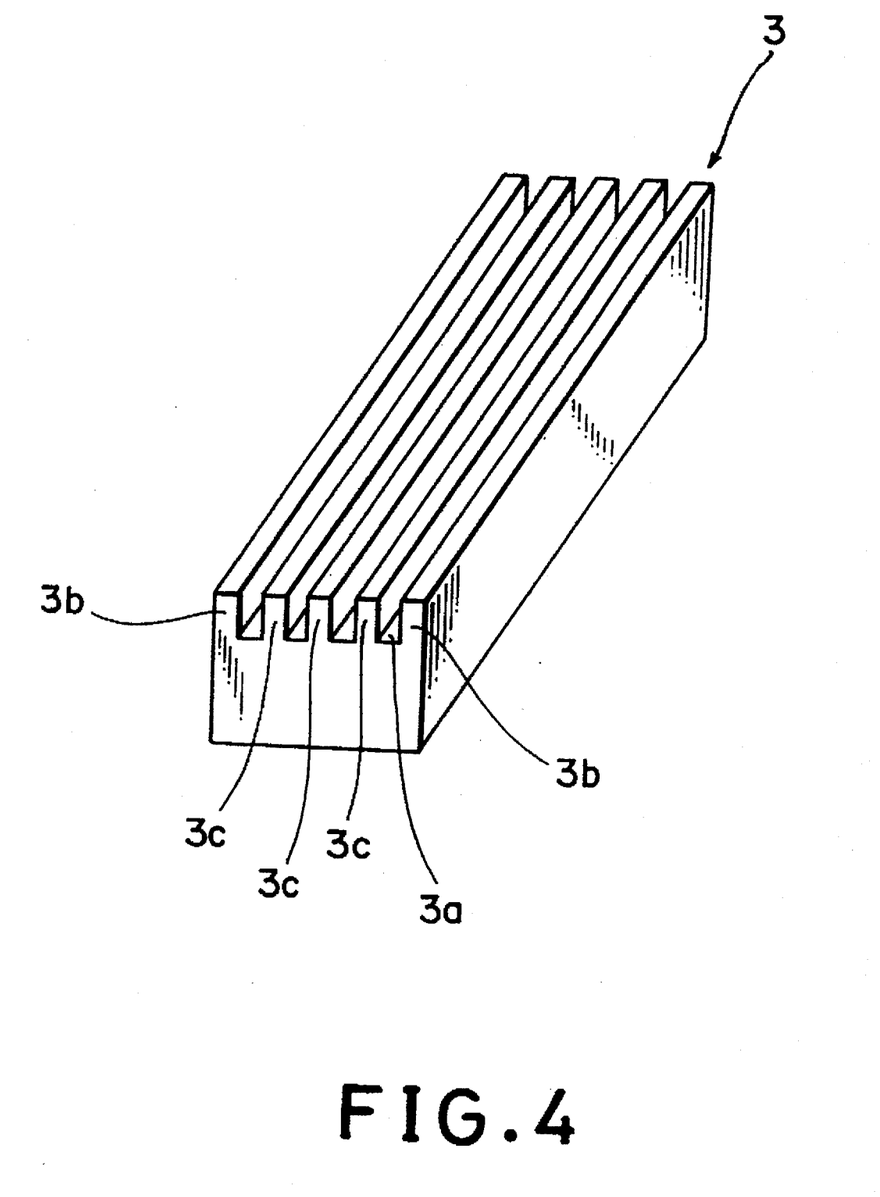
FIG. 4 is a perspective view of a reinforcement case appliribbon to the second embodiment shown in FIGS. 3A, 3B and 3C.

FIGS. 3A, 3B and 3C show the arrayed optical fiber coupler according to the second embodiment of the present invention. FIG. 3A is a plan view, FIG. 3B is a cross sectional view of the coupler taken along the line II—II, and FIG. 3C is a cross sectional view of the coupler taken along the line III—III. FIG. 4 is a perspective view of a reinforcement case as a reinforcement member used in the present embodiment.

The difference of the second embodiment from the first embodiment is mainly in the groove structure of the reinforcement case 3. That is, three partitioning walls 3c are formed on the upper surface 3a of the reinforcement case 3 such that 4 grooves can be formed between the fixed walls 3b with the same size. The elongated portion of a pair of optical fibers 2 is arranged in each of the groove. The protection coating layers 2a and glass portions 2b of the optical fibers 2 are fixed by an adhesive layer 4 for every groove. The collectively coating resin layer of the arrayed optical fiber ribbon is also not fixed to the reinforcement case in the second embodiment, as in the first embodiment and hence the degradation of transmission characteristics can be avoided.

Figure 5A:
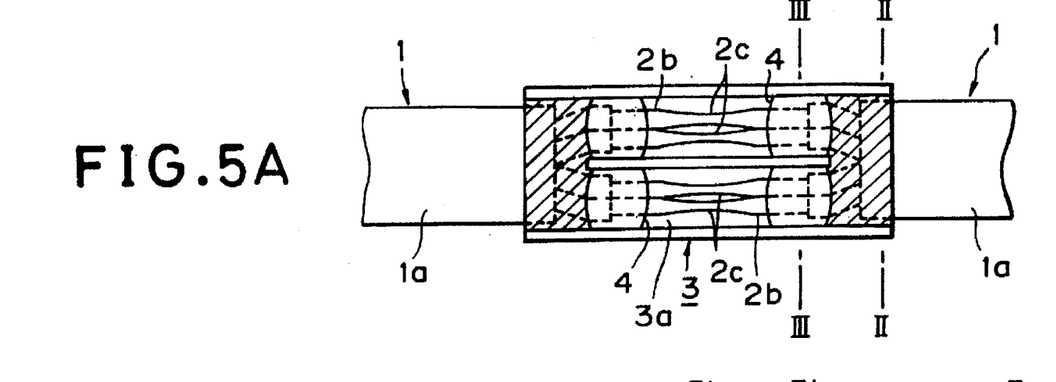
FIG. 5A is a plan view.
Figure 5B:
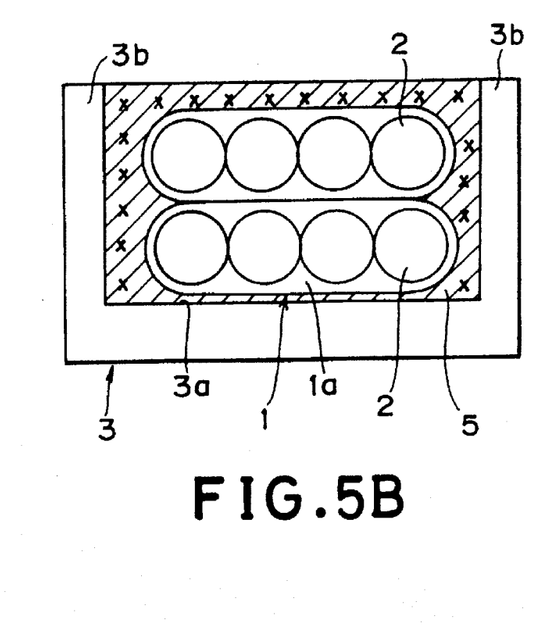
FIG. 5B is a cross sectional view taken along the II—II line.
Figure 5C:
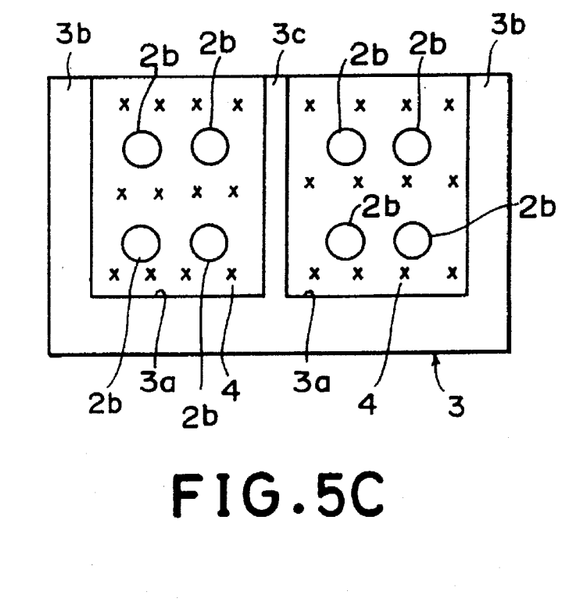
FIG. 5C is a cross sectional view taken along the III—III line.
Figure 6:
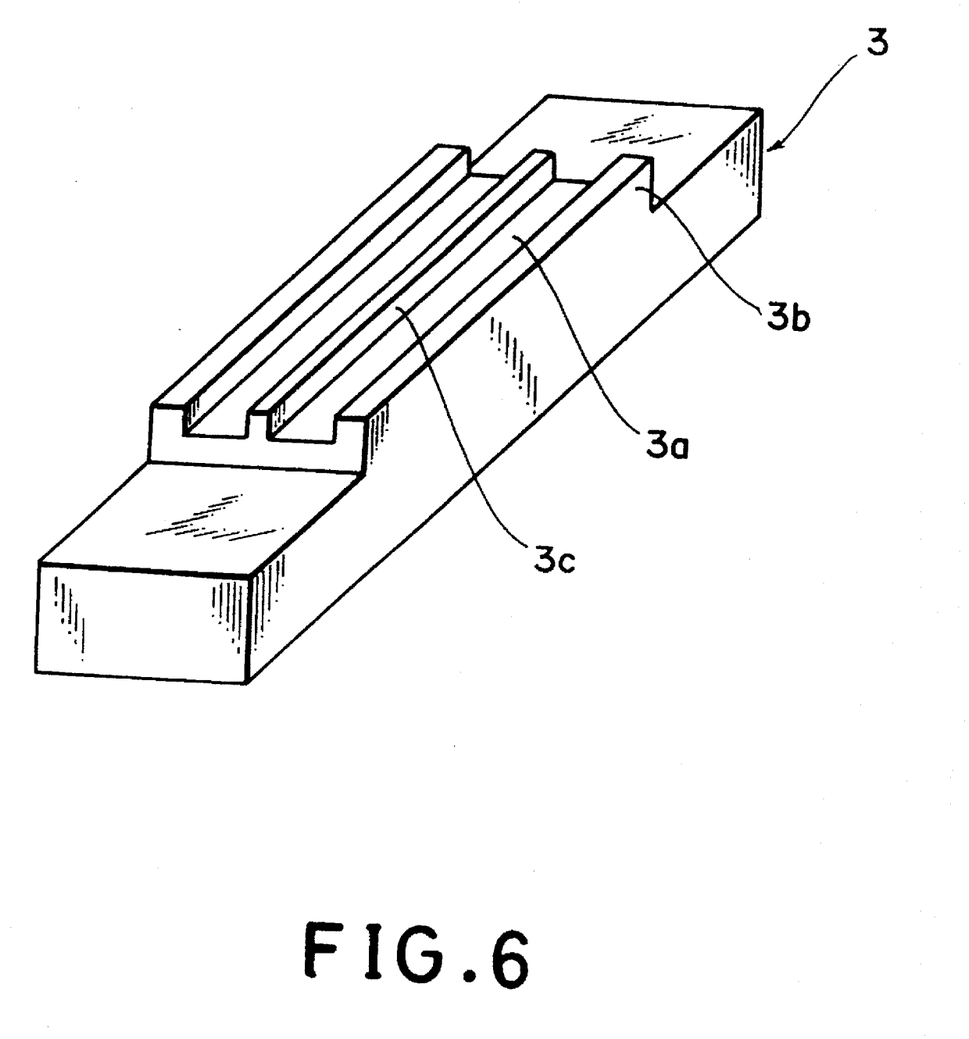
FIG. 6 is a perspective view of a reinforcement case appliribbon to the third embodiment shown in FIGS. 5A, 5B and 5C.

FIGS. 5A, 5B and 5C show the arrayed optical fiber coupler according to the third embodiment of the present invention. FIG. 5A is a plan view, FIG. 5B is a cross sectional view of the coupler taken along the line II—II, and FIG. 5C is a cross sectional view of the coupler taken along the line III—III. FIG. 6 is a perspective view of a reinforcement case as a reinforcement member used in the present embodiment.

The difference of the third embodiment from the first embodiment is mainly in the structure of the reinforcement case 3 and in that two types of adhesive having different Young's moduli are used in the fixing of the coupler to the reinforcement case. The same 4-core type optical fiber ribbon as in the first embodiment is used as the arrayed optical fiber ribbon and the collectively coating resin layer of the ribbon 1 is also fixed to the reinforcement case 3 by an adhesive layer 5 in this embodiment. The adhesive layer 5 is softer than the adhesive layer 4 by which the protection coating layer 2a and glass portion 2b of the optical fiber 2 are fixed to the reinforcement case 3. For this reason, even if the collectively coating resin layer 1a of the optical fiber ribbon 1 is directly fixed to the reinforcement case 3, the transmission characteristics are not degraded because the influence of distortion remained in the collectively coating resin layer 1a upon the manufacturing can be canceled or eliminated by the difference between the adhesive layers 4 and 5 in the Young's modulus.

Figure 7A:
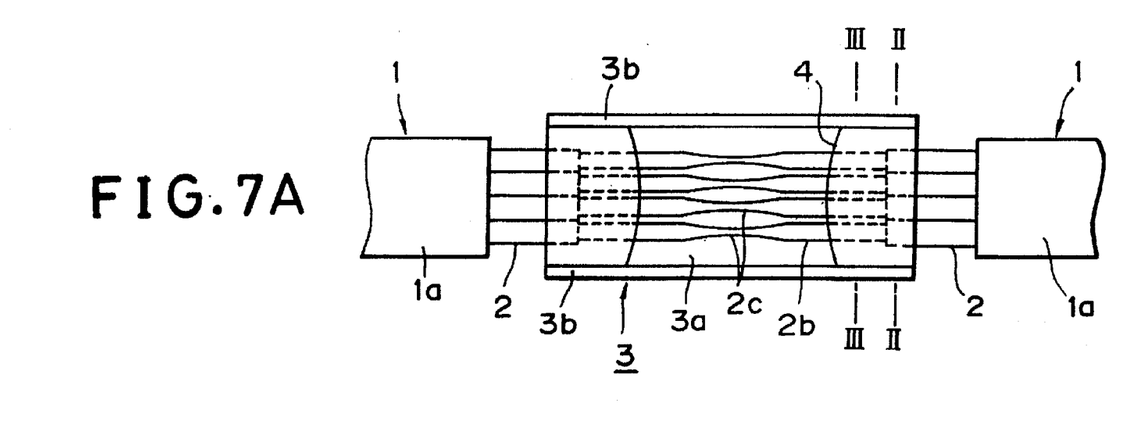
FIG. 7A is a plan view.
Figure 7B:
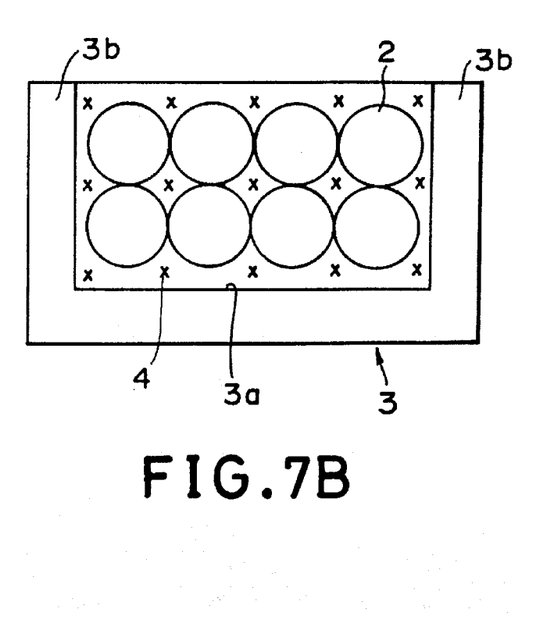
FIG. 7B is a cross sectional view taken along the II—II line.
Figure 7C:
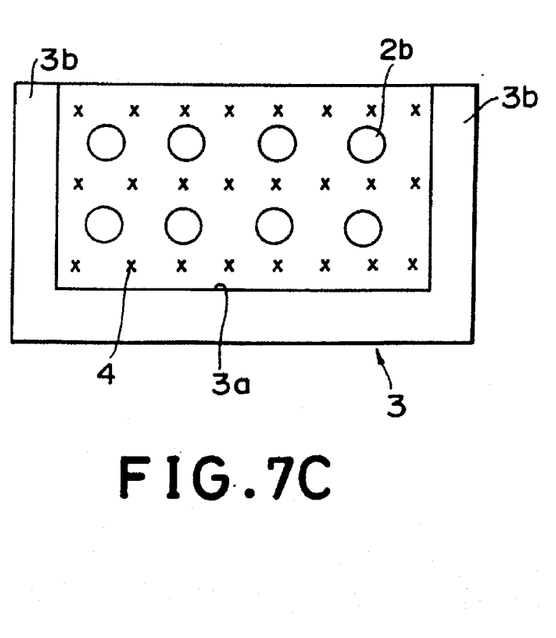
FIG. 7C is a cross sectional view taken along the III—III line.

FIGS. 7A, 7B and 7C show the arrayed optical fiber coupler according to the fourth embodiment of the present invention. FIG. 7A is a plan view, FIG. 7B is a cross sectional view of the coupler taken along the line II—II, and FIG. 7C is a cross sectional view of the coupler taken along the line III—III.

The present embodiment indicates an example of the reinforcement structure in the coupler in which the reinforcement case shown in FIG. 10B is used. Also in the embodiment, the protection coating layer 2a and glass portion 2b of the optical fiber 2 of the 4-core type optical fiber ribbon 1 are fixed to the reinforcement case 3 by the adhesive layer 4. This fixing does not concern with the fixing of the collectively coating resin layer 1a of the optical fiber ribbon 1 to the reinforcement case 3. Therefore, the coupler in the embodiment is not influenced by the distortion remained in the collective coating resin layer 1a.

Figure 8A:
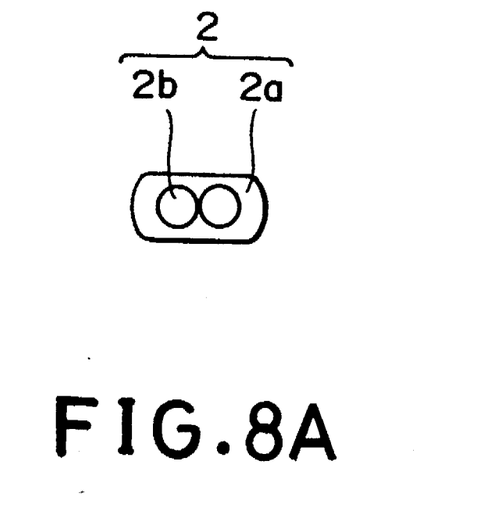
Figure 8B:
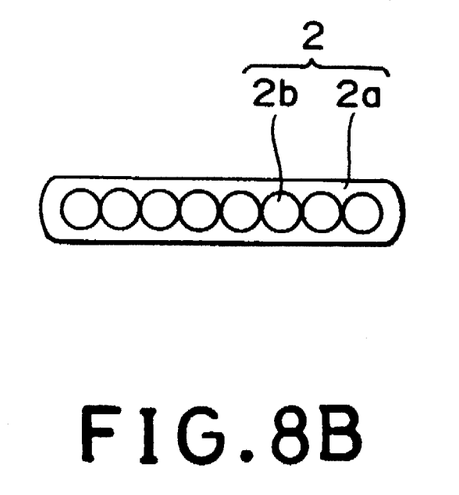
FIG. 8B shows a 8-core type of tape ribbon.

In the above embodiments, the 4-core type optical fiber ribbon is used as the arrayed optical fiber ribbon. However, a 2-core type optical fiber ribbon shown in FIG. 8A or a 8-core type optical fiber ribbon shown in FIG. 8B may be used. Although ultraviolet cure resin or thermosetting resin is used as a material for the collectively coating resin layer used in the above embodiments, the material is not limited to them. Further, the material of the reinforcement case needs to have the line expansion coefficient as large as the quartz optical fiber and the material such as quartz, liquid crystal plastics (LCP), fiber reinforced plastics (FRP), and invaliable alloys may be used. The adhesive such as ultraviolet cure adhesive, thermosetting adhesive, and ultraviolet ray and thermosetting adhesive may be used as the adhesive for forming the adhesive layer.

Figure 9:
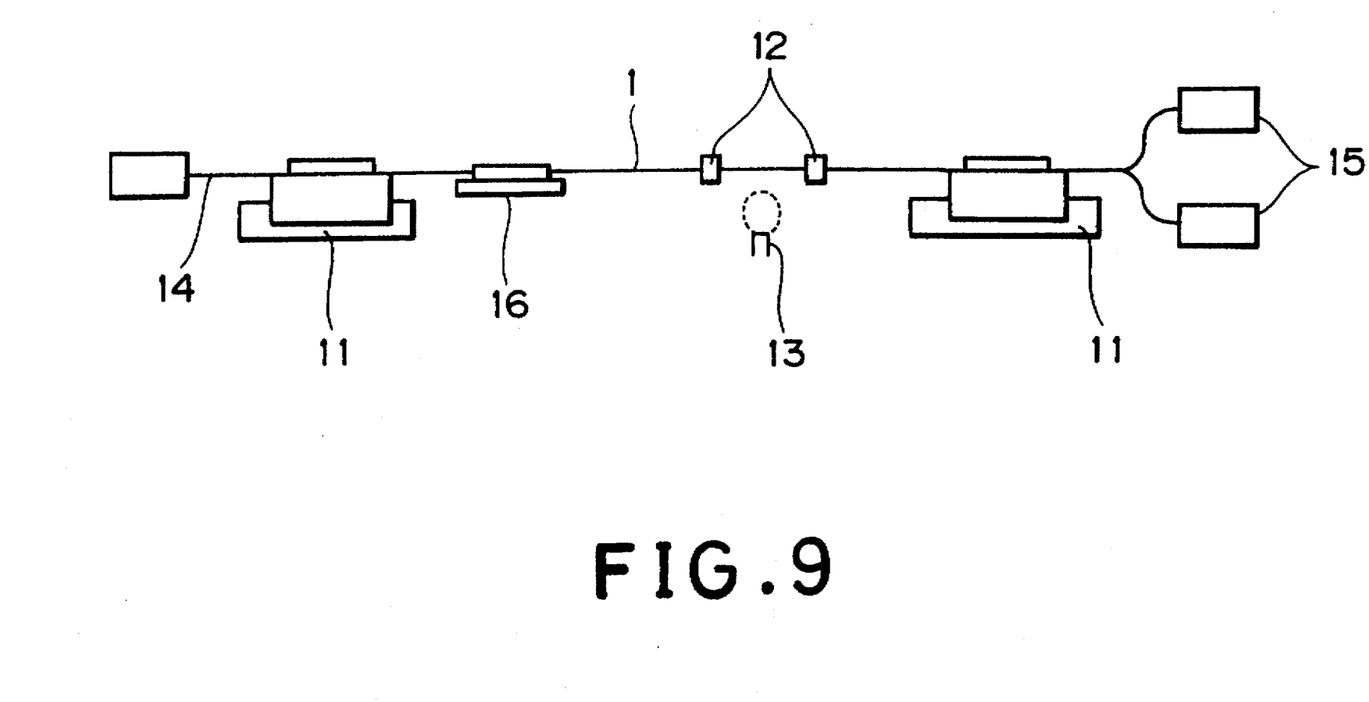
FIG. 9 is a diagram showing a group of units which are used to achieve the reinforcement structure in the arrayed optical fiber coupler of the present invention.

FIG. 9 shows a group of units which are used to achieve the arrayed optical fiber coupler according to the present invention. In the figure, a reference numeral 11 denotes an elongating stage, 12 an optical fiber clamper, 13 a microtourch, 14 a light source, 15 a power meter, and 16 a reinforcement case supporting stage.

Next, the outline of processes in which the arrayed optical fiber coupler used in this invention is fixed to the reinforcement case using the units will be described below. For instance, the collectively coating resin layer 1a is removed from the central portion of the arrayed optical fiber ribbon 1 shown in FIG. 1A and the optical fibers 2 are separated in plural. Then, the protection coating layer 2a of each of the optical fibers 2 is removed to expose the glass portion 2b. The exposed glass portions 2b are fixed by the optical fiber clamper 12 and heated by the microtourch 13 such that the glass portions 2b are melted and coupled to each other. Thereafter, the coupled optical fibers 2 is released from the optical fiber clamper 12 and the coupled glass portions are heated and elongated while tension to them is maintained. At this time, the coupled glass portions are heated and elongated while the light branch state of the coupler is monitored using the light source 14 and the power meter 15 and when a predetermined light branch state is achieved, the elongating operation is stopped. Next, the reinforcement case supporting stage 16 is moved to position the reinforcement case on the stage on a predetermined position and the coupler is fixed to the reinforcement case by the adhesive. At this time, it is important to fix the exposed glass portions on the both sides of the elongated portion 2c as peripheral glass portions and the protection coating layers outside of the peripheral glass portions to the reinforcement case.

Next, the embodiments of the present invention will be described below, taking a particular example.

A 4-core type tape ribbon is prepared in which four optical fibers are collectively coated, two layers protection coating being performed for each of the 3 m band single mode optical fibers which has the difference between the core and the clad in refractive index of 0.3%, the core diameter of 8 µm, the clad diameter of 1.25µm. Using the 4-core type tape ribbon, a coupler is fabricated by the above group of units to have the branch ratio of 50% in the light of wavelength of 1.3µm.

The reinforcement case made from crystalline glass (linear expansion coefficient: $1.5 \times 10^{-7}/°$ C.) is used.

Every two of the optical fibers are accommodated in one of the grooves of the reinforcement case having the structure shown in FIG. 2 and the glass portion of each optical fiber other than the elongated portion and the protection coating layer are fixed to the reinforcement case to obtain the structure shown in FIG. 1A. Ultraviolet cure type adhesive is used in the fixing (embodiment 1).

Each of the optical fibers is accommodated in one of the grooves of the reinforcement case having the structure shown in FIG. 4 and the glass portion of each optical fiber other than the elongated portion and the protection coating layer are fixed to the reinforcement case by ultraviolet cure type adhesive to obtain the structure shown in FIG. 3A (embodiment 2).

Every two of the optical fibers are accommodated in one of the grooves of the reinforcement case having the structure shown in FIG. 6 and the glass portion of each optical fiber other than the elongated portion is fixed to the groove by ultraviolet cure type adhesive as well as the tape ribbon is fixed to the non-groove surface of the reinforcement case by soft thermosetting type adhesive (Young's modulus: about 0.07 kg/mm$^2$) to obtain the structure shown in FIG. 5A (embodiment 3).

Using the reinforcement case having the structure shown in FIG. 10B, the optical fibers are fixed as in the first and second embodiments to obtain the structure shown in FIG. 7A (embodiment 4). That is, the collectively coating resin layer of the tape ribbon is never fixed to the reinforcement case but is outputted outside of the case.

On the other hand, the same arrayed optical fiber coupler as described above is fixed to the reinforcement case having the structure shown in FIG. 10B by ultraviolet cure type adhesive. In this case, the collectively coating resin layer is also fixed to the same reinforcement case by the same adhesive to obtain the structure shown in FIG. 10a (a comparison example).

A heat cycle test between −20 to 60° C. is performed for the couplers of the first to third embodiments and the comparison example under the same condition. The transmission losses of the couplers are measured during the test using a laser emission diode (LED) having the wavelength of 1.3 μm. The measuring result is shown in a table 1. In the table 1, "core 1", core "2", "core 3", and "core 4" indicate the coupler numbers from one end of the 4-core type tape ribbon. The value of greater change of the insertion losses at a straight port and a cross port is shown as the value of the loss change in the table 1.

TABLE 1

| ** | embodiment 1 | embodiment 2 | embodiment 3 | embodiment 4 | comparison |
|---|---|---|---|---|---|
| core 1 | +0.11 | +0.06 | +0.04 | +0.07 | +0.18 |
| core 2 | +0.06 | +0.13 | +0.06 | +0.12 | +0.38 |
| core 3 | −0.03 | +0.08 | −0.05 | +0.15 | +1.09 |
| core 4 | +0.02 | −0.02 | +0.03 | +0.06 | +0.56 |

**loss change (dB) during heat cycle

As seen from the table 1, the comparison example has the remarkable characteristic change depending upon temperature and there is appears the influence of the distortion remained in the collectively coating resin layer from when the tape ribbon is manufactured. On the other hand, in the embodiments 1 to 3, because the influence of such distortion does not appear, the transmission characteristics of the couplers are stable.

Figure 13A:
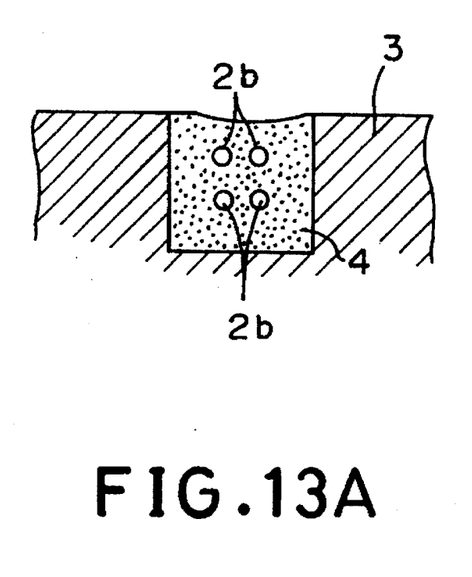
FIG. 13A shows the structure in which the space surrounded by the 4-core type optical fiber ribbon is filled with fixing resin.
Figure 13B:
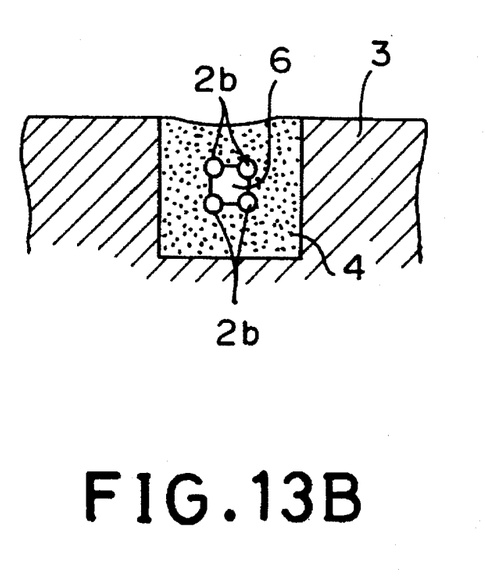
FIG. 13B shows the structure in which the space is not filled with the fixing resin.

There is studied the characteristic change of the arrayed optical fiber couplers having the reinforcement structures by the adhesive as described above under the particular circumstance tests (heat cycle test and high humid and hot test). That is, as a result of the study of the characteristic change in the above circumstance tests by the inventors of the following facts are found. FIG. 13A shows a cross sectional view of the fixed portion of the coupler which has the characteristic change (coupling loss change) of 0.06 dB in the heat cycle test shown in FIG. 11 and is superior in the circumstance resistance characteristics and FIG. 13B shows a cross sectional view of the fixed portion of the coupler which has the characteristic change of 0.5 dB in the same heat cycle test and is inferior in the circumstance resistance characteristics. As seen from FIG. 13A in the fixed portion of the superior coupler the space formed between 4 optical fibers 2b is completely filled with the adhesive layer 4 and on the contrary as seen form FIG. 13B in the fixed portion of the inferior coupler the space formed between 4 optical fibers 2b is not completely filled with the adhesive layer to form a cavity 6. In the heat cycle test when the coupler is located in low temperature a small bending stress would act on each optical fiber (125 μmφ) 2b because of ununiform expansion or contraction of the resin so that the transmission characteristics are changed. The inventors fabricate samples in various viscosities of resin (adhesive) of the fixed portion in order to eliminate the generation of the cavity 6 and thereby the characteristic change in the heat cycle test. The following table 2 indicates the result.

It seen from the above table 2 that the resin (adhesive) viscosity for fixing the optical fiber is preferably in a range of 50 P to 200 P. That is, the types of resin c to e are suitable for the resin (adhesive) for fixing the optical fibers of the arrayed optical fiber coupler according to the present invention.

TABLE 2

Relation of the generation rate of cavity and fault by heat cycle test to resin (adhesive) viscosity

| (type of resin) | (viscosity) | (generation rate of cavity) | (ratio of of characteristic change (0.2 dB or more) |
|---|---|---|---|
| a | 800 P | 60% | 50% |
| b | 400 | 20 | 10 |
| c | 200 | 5 | 0 |
| d | 100 | 0 | 0 |
| e | 50 | 0 | 0 |
|   | (not easy to coat) |   |   |
| f | 30 |   |   |
|   | (cannot coat) |   |   |

Figure 14:
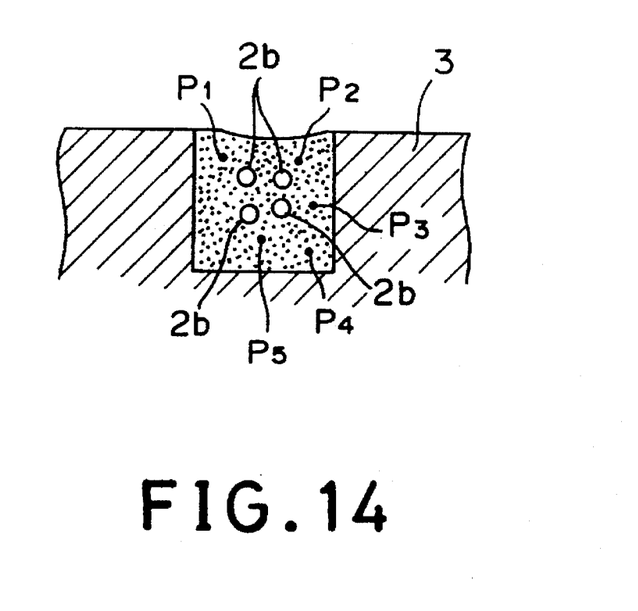
FIG. 14 is a cross sectional view showing points P1 to P5 of the fixed portion shown in FIG. 13A where hardness is measured.

Next, The optical fiber fixed portion was cut as in the above and the resin hardnesses in the cross section were measured by a micro FTIR (Fourier transformation type infrared spectrometer). In FIG. 14 the hardness in the measuring point P1 was 95%, P2 96%, P3 93%, P4 88%, and P5 70%. As seen from FIG. 14, it was found that the hardness was lack in the lower portion of the optical fiber (P4 or P5). Because the optical fibers are collectively fixed, the light intensity would be weak in the lower portion of the optical fibers so that the cure of the resin is insufficient. If the cure of the resin is insufficient, it is expected that a portion where polymerization is not caused reacts with water so that the deterioration of the resin is caused under a high humid and hot circumstance.

The inventors fabricated samples using ultraviolet cure and thermosetting resin such that the hardness of the resin in the lower portion of the optical fibers was the same as that of other portions. The following table 3 indicates the result. The symbol "*" in the table 3 indicates the high humid and hot test in the ambient of humidity of 90% at 60° C. for 100 hours.

TABLE 3

Relation of change in high humid and hot test to type of resin and hardening condition

| (type of resin) | (hardening condition) | (characteristic change upon high humid and hot test) |
|---|---|---|
| UV | short | 0.13 dB |
| UV | long | 0.1 dB |
| UV + thermo | short | 0.05 dB |

It is found from the table 3 that ultraviolet ray and thermosetting type resin is good in characteristic and preferable in productivity.

Next, the high humid and hot test in the ambient of humidity of 90% at 60° C. for 100 hours was performed for the couplers of the embodiments 1 and 3 in which the ultraviolet cure adhesive was not used. A monitor wavelength was 1.31 μm and the change of transmission loss was measured for each "optical fiber" of each coupler. The measuring result is shown in a table 4. In the table 4, "fiber 1", "fiber 2", "fiber 3" and "fiber 4" are the same as in the table 1.

TABLE 4

| | Result of high humid and hot test | |
|---|---|---|
| | embodiment 1 | embodiment 2 |
| fiber 1 | 0.05 dB | 0.03 dB |
| fiber 2 | 0.04 | 0.05 |
| fiber 3 | 0.06 | 0.03 |
| fiber 4 | 0.08 | 0.02 |

As seen from the table 4, it is found that the couplers of the embodiments 1 and 3 have extremely small characteristic change.

Possibility of Industrial Application

As described above, according to the present invention, the protection of the coupler structure can be reinforced and the stabilization of transmission characteristics can be achieved because the influence of distortion remained in the collectively coating resin layer of the arrayed optical fiber ribbon can be eliminated. The optical fiber coupler added with such a reinforced structure can sufficiently cope with the recent high density optical communication line by the stability of the transmission characteristics.

In addition, according to the present invention, by fixing the optical fibers with resin having a viscosity of 50 P to 200 P before cure, the arrayed optical fiber coupler can be obtained in which a cavity can be prevented from being generated in a portion surrounded by the optical fibers with less characteristic change in heat cycle test and with sufficient circumstance resistance characteristics.

Further, according to the present invention, by using ultraviolet ray and thermosetting type resin as an adhesive for fixing the optical fibers, the arrayed optical fiber coupler can be obtained with superior high humid and hot characteristic and with sufficient circumstance resistance characteristics because the hardness of the resin can be increased even in the lower portion of the optical fibers.

What is claimed is:

1. An arrayed optical fiber coupler comprising:
   two arrayed optical fiber ribbons that have been connected by melting, bonding, and elongating glass portions of each arrayed optical fiber ribbon, each arrayed optical fiber ribbon including:
      a plurality of optical fibers being arranged in parallel to each other, each optical fiber including one of the glass portions and a corresponding protection coating layer, and
      a resin coating layer that coats each of the plurality of optical fibers; and
   a reinforcement structure including a first reinforcement member to which both a portion of the glass portions and the corresponding protection coating layers are affixed by an first adhesive layer, wherein the resin coating layer and the first reinforcement member are not fixed to each other.

2. An arrayed optical fiber coupler as claimed in claim 1, wherein the arrayed optical fiber coupler further comprises a second reinforcement member to which the resin coating layer is affixed by a second adhesive layer, wherein the second adhesive layer is different from the first adhesive layer.

3. An arrayed optical fiber coupler as claimed in claim 2, wherein adhesive material in the second adhesive layer has a Young's modulus of 1 kg/mm$^2$ or less.

4. An arrayed optical fiber coupler as claimed in claim 1, wherein the two arrayed optical fiber ribbons are affixed to the first reinforcement member only by affixing the portion of the glass portions and the corresponding protection coating layer to the first reinforcement member.

5. An arrayed optical fiber coupler as claimed in any one of claims 1 to 4, wherein the reinforcement member has a groove for arranging two of the plurality of optical fibers in parallel.

6. An arrayed optical fiber coupler as claimed in claim 1, wherein the first adhesive layer comprises an adhesive having a viscosity of 50 to 200 P before being cured.

7. An arrayed optical fiber coupler as claimed in claim 1, wherein the adhesive layer comprises an adhesive having a thermosetting property and a ultraviolet cure property.

8. A method of manufacturing an arrayed optical fiber coupler comprising the steps of:
   removing a resin coating layer and a plurality of protection coating layers from two arrayed optical fiber ribbons so as to expose glass portions, wherein:
      each arrayed optical fiber ribbon includes a plurality of optical fiber, which are arranged in a parallel manner, and the resin coating layer, which coats each of the optical fibers, and
      each optical fiber includes one of the glass portions and one of the protection coating layers;
   heating, melting, connecting and elongating two of the exposed glass portions so as to form an elongated portion; and
   fixing portions of the glass portions that are located on both sides of the elongated portion and the protection coating layer to a reinforcement member.

9. A method as claimed in claim 8, wherein the fixing step includes the use of an adhesive having a viscosity of 50 to 200 P before being cured.

10. A method as claimed in claim 8, wherein the fixing step includes the use of an adhesive having a thermosetting property and an ultraviolet cure property.

11. A method of manufacturing an arrayed optical fiber coupler, comprising the steps of:
   removing, from 2n optical fibers, protection coating layers so as to expose glass portions of the optical fibers, wherein n is a natural number;
   arranging the exposed glass portions in a parallel manner; and
   after melting and elongating the arranged exposed glass portions, collectively fixing the glass portions and the protection coating layers to a reinforcement member, wherein said fixing step includes the use of an adhesive having a viscosity of 50 to 200 P before being cured.

12. A method as claimed in claim 11, wherein the adhesive is replaced with an adhesive that has a thermosetting property and an ultraviolet cure property.

13. A method as claimed in claim 11 or 12, wherein the 2n optical fibers are part of two optical fiber tape ribbons.

* * * * *